(12) United States Patent
Bell et al.

(10) Patent No.: US 6,717,798 B2
(45) Date of Patent: Apr. 6, 2004

(54) DOCKING DIGITAL PICTURE DISPLAYS (75) Inventors: Cynthia S. Bell, Chandler, AZ (US); Gregg E. Hardy, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 09/814,886

(22) Filed: Mar. 22, 2001

(65) Prior Publication Data

US 2002/0135974 A1 Sep. 26, 2002

(51) Int. Cl.[7] .................................................. G06F 1/16
(52) U.S. Cl. ........................ 361/681; 361/679; 361/683; 345/901; 312/223.1
(58) Field of Search ........................ 361/679, 681–683, 361/685–687, 724–727, 730, 825, 829; 439/157, 159, 160, 352, 923, 919–921, 917, 125.7, 125.1; 345/901, 903–905, 169, 173, 175, 102, 104; 341/21–24; 248/917–923; 312/223.1–223.6; 360/97.01; 16/329–342

(56) References Cited

U.S. PATENT DOCUMENTS

| | | | | |
|---|---|---|---|---|
| 5,133,076 A | * | 7/1992 | Hawkins et al. ............. 708/141 |
| 5,436,792 A | * | 7/1995 | Leman et al. ................ 361/686 |
| 5,633,782 A | * | 5/1997 | Goodman et al. ........... 361/683 |
| 5,751,547 A | * | 5/1998 | Honda et al. ................ 361/686 |
| 5,751,548 A | * | 5/1998 | Hall et al. .................... 361/686 |
| 6,282,082 B1 | * | 8/2001 | Armitage et al. ............ 361/681 |
| 6,400,560 B1 | * | 6/2002 | Chian .......................... 361/681 |
| 6,445,936 B1 | * | 9/2002 | Cannon et al. .............. 455/573 |
| 6,477,588 B1 | * | 11/2002 | Yerazunis et al. ............. 710/13 |
| 6,639,577 B2 | * | 10/2003 | Eberhard ..................... 345/102 |

* cited by examiner

Primary Examiner—Michael Datskovsky
(74) Attorney, Agent, or Firm—Trop, Pruner & Hu, P.C.

(57) ABSTRACT

A digital picture display system may operate through a wireless connection to a remote processor-based display. The system may operate in a portable and/or a fixed mode. In the portable mode, a portable display device may be wirelessly coupled to the processor-based system and may function using its own onboard battery source. In a fixed mode, the portable device may be plugged into a display station, which not only provides an AC power supply, but also aesthetically frames the display device, providing a picture framing function as well.

30 Claims, 7 Drawing Sheets

DOCKING DIGITAL PICTURE DISPLAYS

BACKGROUND

This invention relates generally to digital picture displays for processor-based systems.

A processor-based system may be a desktop computer, a laptop computer, or an appliance including a processor such as a set-top box, a web tablet, an MP3 player, or a personal digital assistant. Thus, processor-based systems may be "portable", operating at least part of the time from a battery power source, or "fixed", operating from a wall power source.

A digital picture display is a peripheral for a processor-based system that displays pictures such as family photographs and the like. Digital picture displays may be mobile devices that wirelessly receive images for display from a remote base station that is generally a processor-based system. Alternatively, digital picture displays may be hard-wired to a processor-based system. The benefit of the wired system is that a battery power source is not necessary and therefore the cost of the device may be less. The portable digital picture displays require a battery but pictures may be displayed in any convenient location.

Thus, there is a need for a digital picture display that includes the advantages of both portable and fixed digital picture displays.

DETAILED DESCRIPTION

Figure 1:
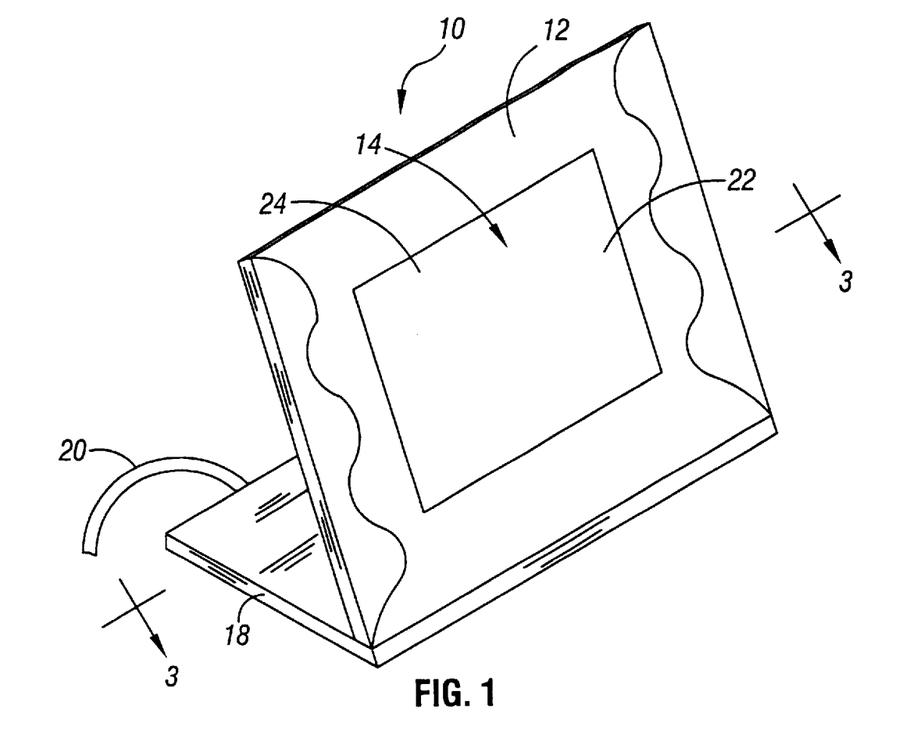
FIG. 1 is a front perspective view of one embodiment of the present invention.

Referring to FIG. 1, a portable digital picture display system 10 includes a fixed display station 12, and a portable digital picture display device 14. The display station 12 receives and displays the portable digital picture display device 14 and acts as a docking station, providing an AC power supply for powering the device 14 and for recharging its battery power supply.

Thus, the device 14 is considered a portable device since it need not be permanently connected to a wall socket power supply. Conversely, the display station 12 is connected to a wall socket AC power supply and therefore is considered to be a fixed device.

The display station 12 includes a relatively horizontal stand 18 and a frame element 16 fixedly connected to the stand 18, in one embodiment. The frame element 16 is angled with respect to the stand 18 so as to display the portable picture display device 14 at a slightly inclined angle. In particular, the frame element 16 includes an opening 24 to reveal the display 22 of the device 14. A power cord 20, for supplying AC power, may be coupled to the stand 18.

Figure 2:
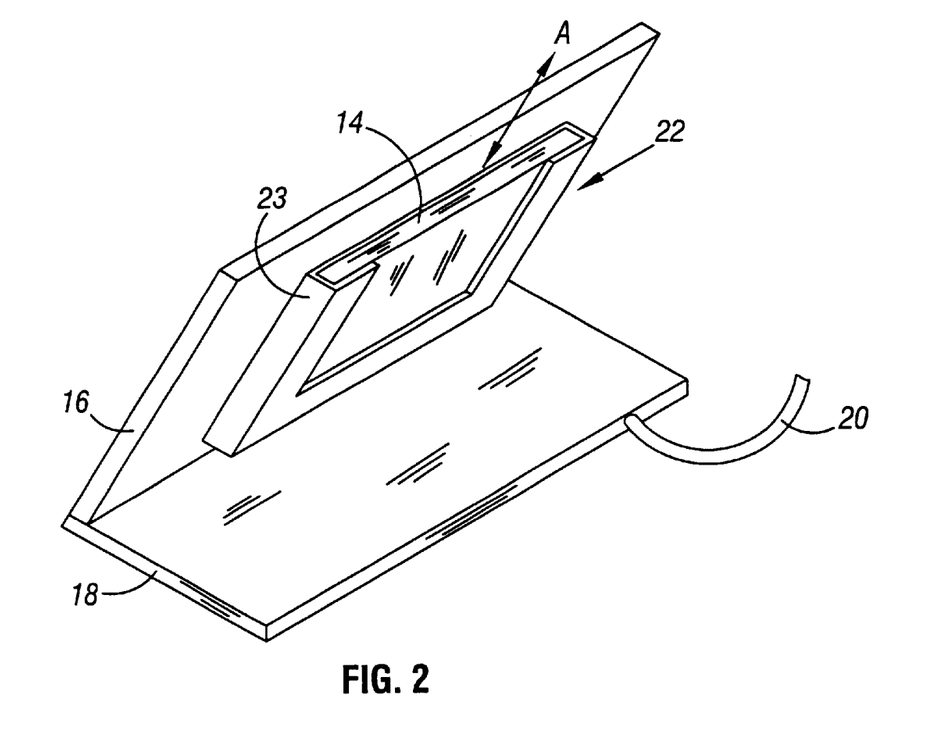
FIG. 2 is a rear perspective view of the embodiment of the present invention shown in FIG. 1.

Referring next to FIG. 2, the frame element 16 may include a receptacle 22, aligned with the opening 24, to receive the portable picture display device 14. In particular, the device 14 slides out of the display station 12 in the direction of the arrows A. Thus, in one embodiment, the portable device 14 may be slid into the receptacle 22 from above so as to align with the opening 24 in the frame element 16. In this position, the display 14 is firmly held by gravity and by the imposition of U-shaped channel members 23 that form the receptacle 22, in one embodiment.

Figure 3:
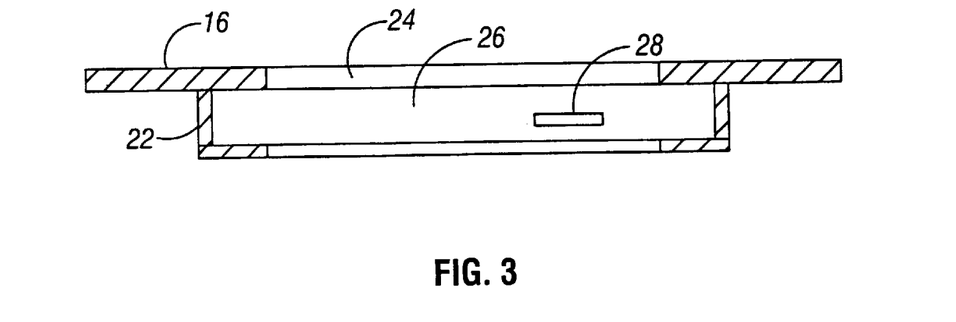
FIG. 3 is an enlarged cross-sectional view taken generally along the line 3—3 in FIG. 1.

Thus, as shown in FIG. 3, the receptacle 22 defines an area to receive the display device 14 in alignment with the opening 24 so that the display 22 of the device 14 is framed by the frame element 16. In this orientation, the system 10 has the appearance of a very conventional picture frame.

At the same time, electrical contact may be made with conductive charging plate 28 to recharge the battery supply of the device 14. The plate 28 enables control signals to be provided from controls (not shown) on the display station 12 for controlling characteristics of the picture displayed by the device 14. While in the one embodiment, the plate 28 may be inductive, other embodiments may be utilized as well including those using conductive male and female sliding connectors.

Figure 4:
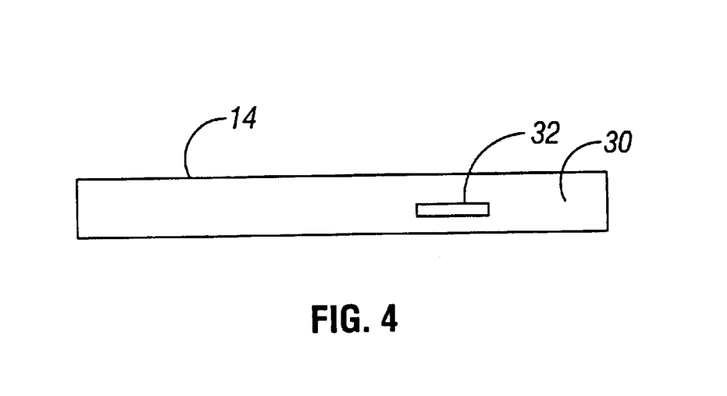
FIG. 4 is a bottom plan view of the portable digital picture display shown in FIG. 2 in accordance with one embodiment of the present invention.

In an inductive arrangement, the plate 28 may engage a plate 32 to inductively communicate with the portable device 14 as shown in FIG. 4. In particular, the device 14 may have a plate 32 as well as a surface 30 to receive the plate 28. Thus, when the device 14 is slid into receptacle 22, it automatically makes an electrical connection with the inductive plate 28 of the station 12. The receptacle surface 26, shown in FIG. 3, at the bottom of the receptacle 22, may be shaped to conform to the surface 30 of the device 14.

The device 14 may be a specialized portable device that wirelessly communicates with a processor-based system in one embodiment of the present invention. The device 14 may act as a digital picture display device but may include other functions as well including those of a personal digital assistant, an MP3 player, a web tablet, a cellular phone, or a pager, to mention a few examples.

Figure 5:
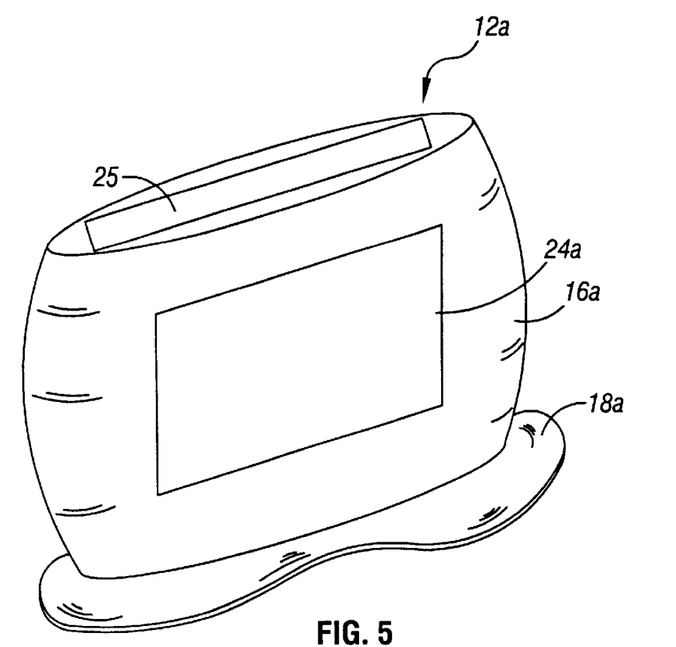
FIG. 5 is a perspective view of an embodiment of the present invention without a portable digital picture display device.
Figure 6:
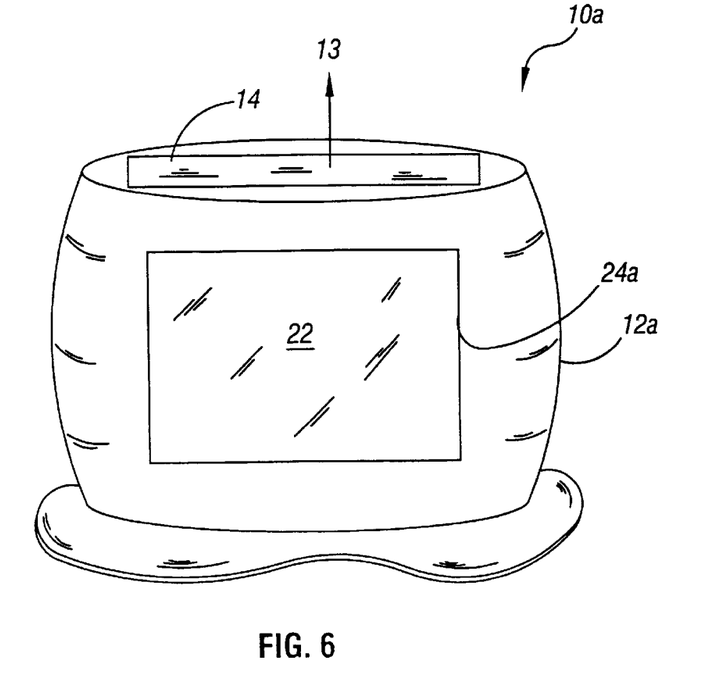
FIG. 6 is a perspective view of the embodiment shown in FIG. 5 after a portable digital picture display device has been inserted in accordance with one embodiment of the present invention.

Turning now to FIG. 5, an alternate embodiment of the system 10 includes a display station 12a that receives the portable device 14 in a roughly tubular enclosure that is closed on all its ends except for its open upper end 25. Thus, as shown in FIG. 6, the device 14 may slide through the open upper end 25 to enable its display 22 to show through the opening 24a in the station 12a. The station 12a may include a frame element 16a and a stand 18a. The device 14 may be removed by manually grabbing and lifting in the direction of the arrow B in FIG. 6. By sizing the interior surfaces of the station 12a to mate with those of the device 14, a smooth sliding interaction may be achieved without providing an excessive gap between the device 14 and the frame element 16a.

Figure 7:
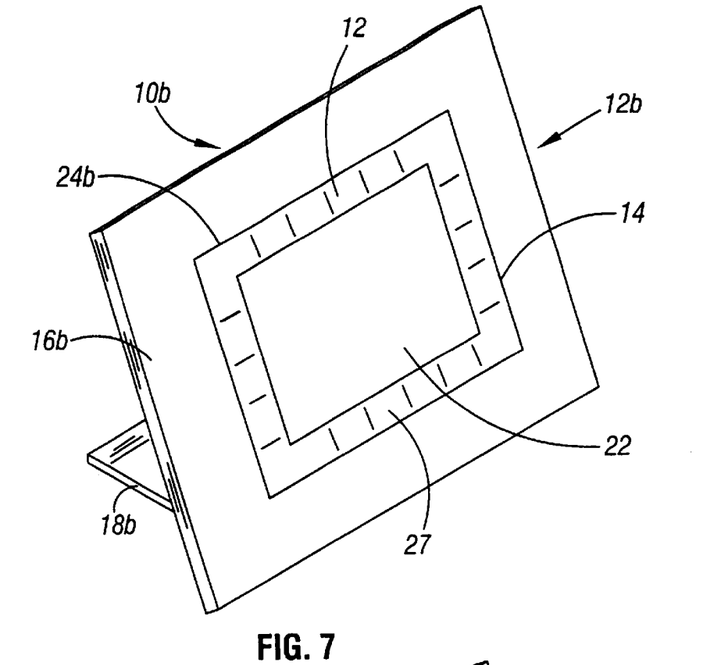
FIG. 7 is a perspective view of still another embodiment in accordance with the present invention.

A digital picture display system 10b, shown in FIG. 7, includes a display station 12b. The station 12b includes a central opening 24b to pluggingly receive the device 14. In other words, the device 14 simply slides (in a direction transverse to the plane described by the frame element 16b) into the surface of the display station 12b. The display station 12b also includes a support 18b. The device 14 includes a housing 27 and a display 22.

Figure 8:
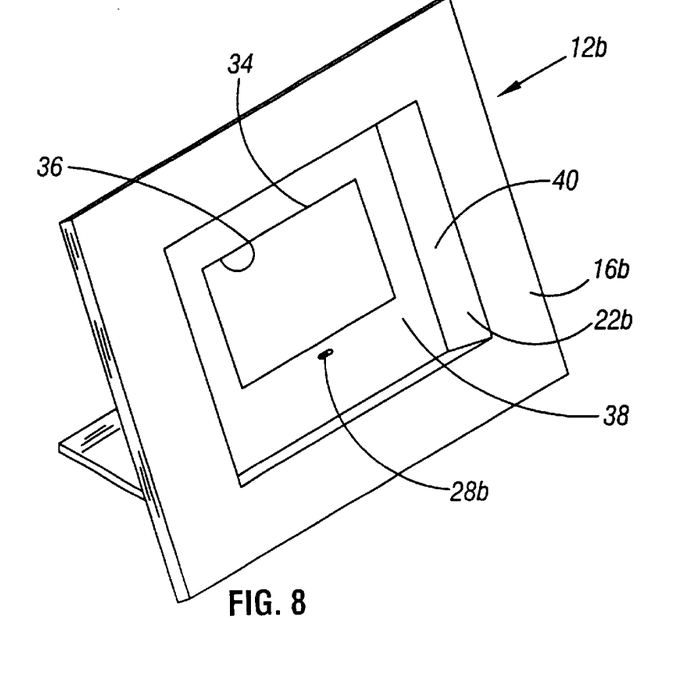
FIG. 8 is a perspective view of the embodiment shown in FIG. 7 with the portable digital picture display device removed, in accordance with one embodiment of the present invention.

Turning to FIG. 8, the station 12b includes a receptacle 22b including a portion 40 that may be arranged generally transversely to the element 16b. A backplate 38 may be arranged generally parallel to the element 16b. In one embodiment, the backplate 38 includes an opening 34 to facilitate manually ejecting the display device 14 from the station 12b. In addition, a pin 28b may be provided to pluggingly interact with an opening (not shown) in the device 14 when plugged into the receptacle 22b.

Again, the element 12b provides a framing function to frame and make more aesthetically pleasing the portable digital picture display device 14 and to provide an electrical power connection as well as display control signals in some embodiments. Like the other embodiments, the station 12b may be connected to an AC power supply.

Figure 9:
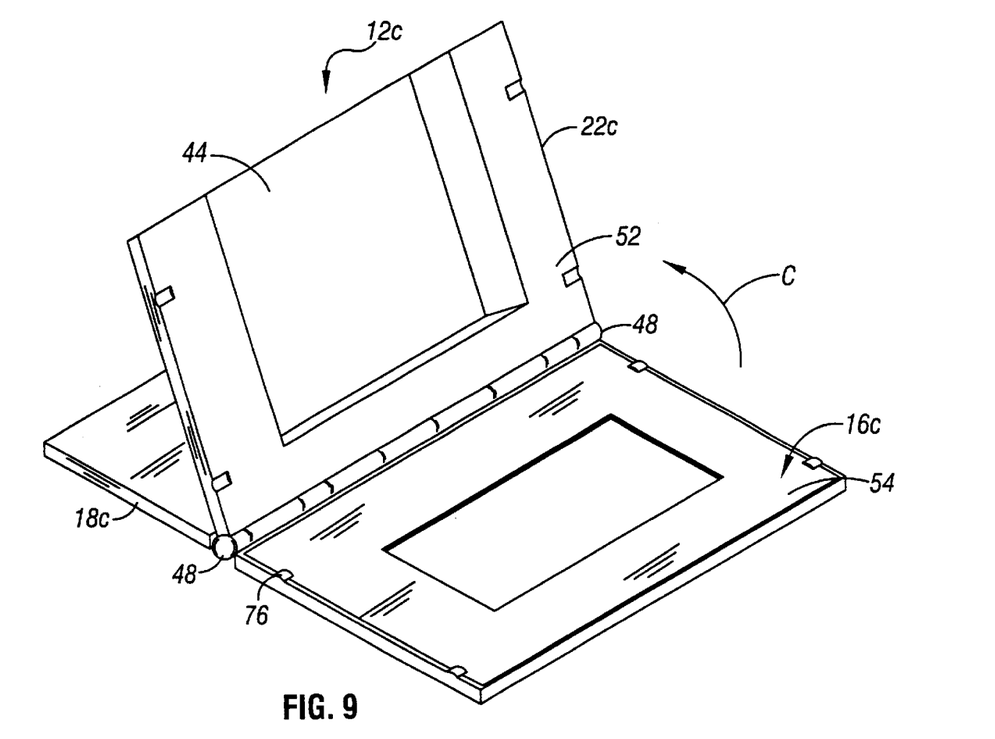
FIG. 9 is an opened perspective view of still another embodiment of the present invention with the digital picture display device removed.

Still another embodiment, shown in FIG. 9, includes a display station 12c that includes a stand 18c and a receptacle 22c. The receptacle 22c includes a planar portion 52 and a recessed portion 44 connected thereto.

The receptacle 22c may be coupled to a frame element 16c that includes an opening 24c to display a display device 14 located in the recessed portion 44. In this embodiment, the frame element 16c may be hingedly connected, using a hinge 48, to both the stand 18c and the receptacle 22c.

A matte 54 may be held on the back of the frame element 16c using catches 76. The matte 54 may be bent slightly to be engaged by the catches 76. When the frame element 16c is rotated atop the receptacle 22c, the catches 76 are engaged in the depressions 78.

In this way, the frame element 16c and matte 54 may be selected to match the user's decor preferences. A variety of different mattes 54 may be utilized with a variety of different frame elements 16c. In one embodiment, the frame element 16c is detachable from the hinge 48.

Figure 11:
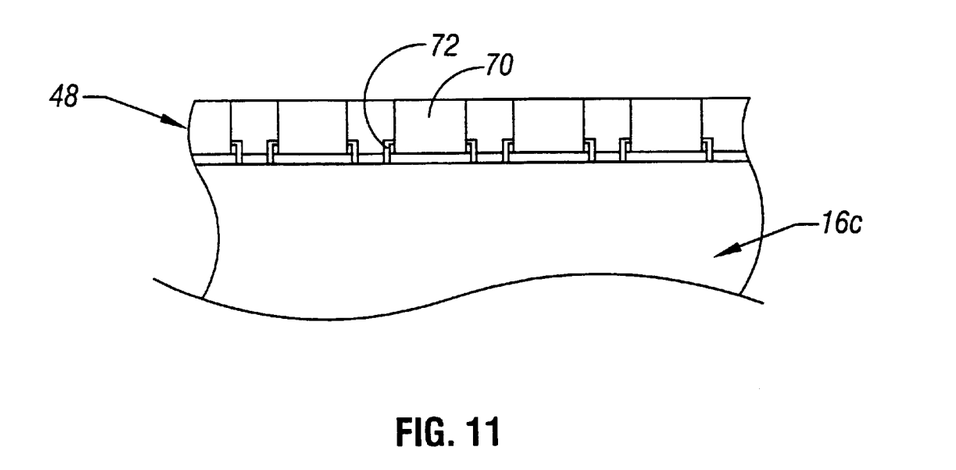
FIG. 11 is a partial, enlarged view of a portion of the hinge shown in FIG. 9.
Figure 12:
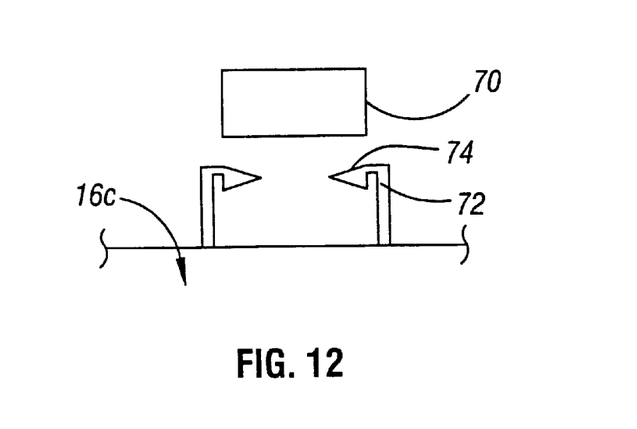
FIG. 12 is a greatly enlarged view of a connection between the frame element 16c and the hinge 48 in accordance with one embodiment of the present invention.
Figure 13:
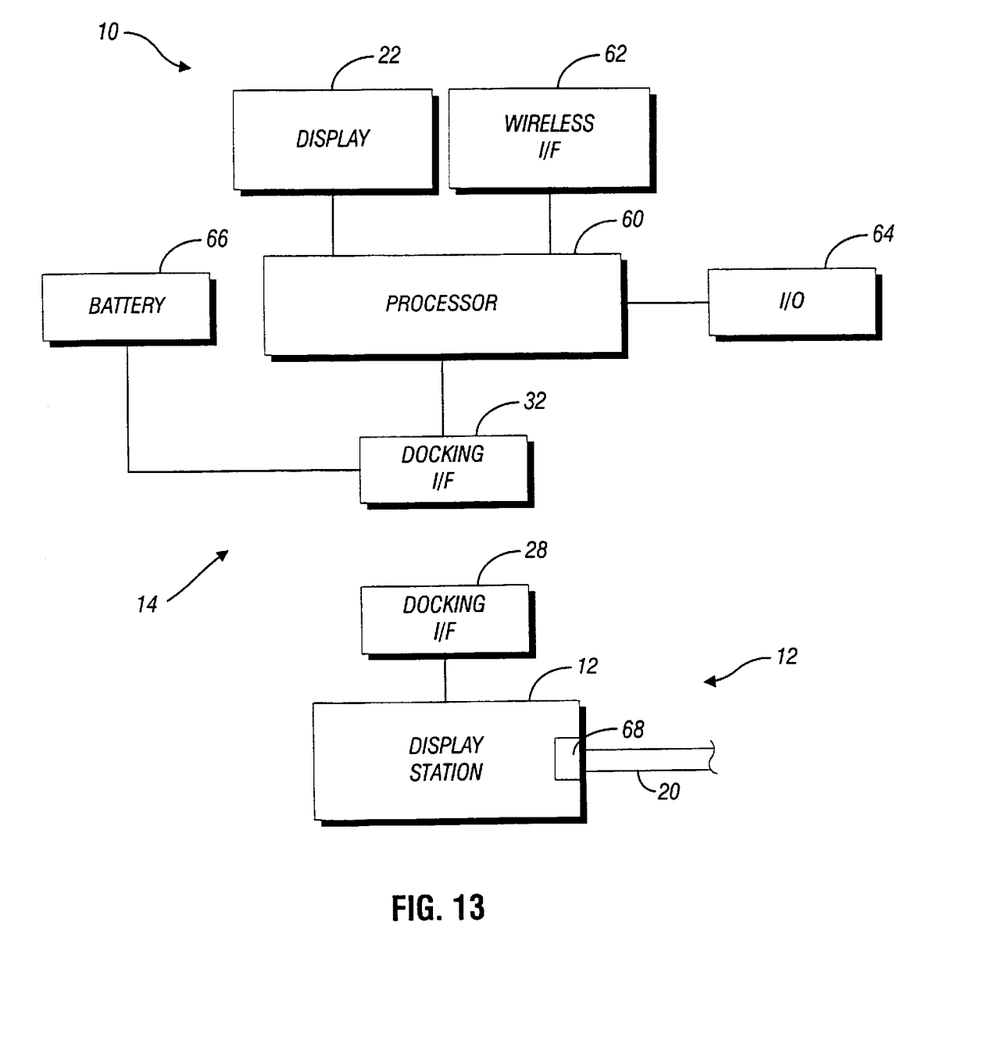
FIG. 13 is a block depiction of one embodiment of the present invention.

Referring to FIG. 11, the frame element 16c may be held on the hinge 48 through the engagement of arms 72 on the inside of the tubular portion 70 of the hinge 48. In one embodiment, the arms 72 are spring arms. Each arm 72, upon engaging a portion 70, may be biased outwardly so that the arms 72 thereafter spring inwardly to be engaged within the interior of the portion 70. This action is aided by the camming surface 74 on each spring arm 72, as shown in FIG. 12. In this way, the frame element 16c may be replaceably connected to the stand 18c and receptacle 22c.

Thus, a display device 14 may be simply positioned in the recessed portion 44. Once in position, the frame element 16c may be rotated in the direction of the arrow C to overlie the display device 14. In this position, the frame element 16c frames the display device 14 through the opening 24c, as shown in FIG. 10.

In some embodiments, it may be desired to include a closure (not shown) to releasably lock the element 16c to the receptacle 22c. This lock may prevent excessive play between receptacle 22c and the element 16c.

Figure 10:
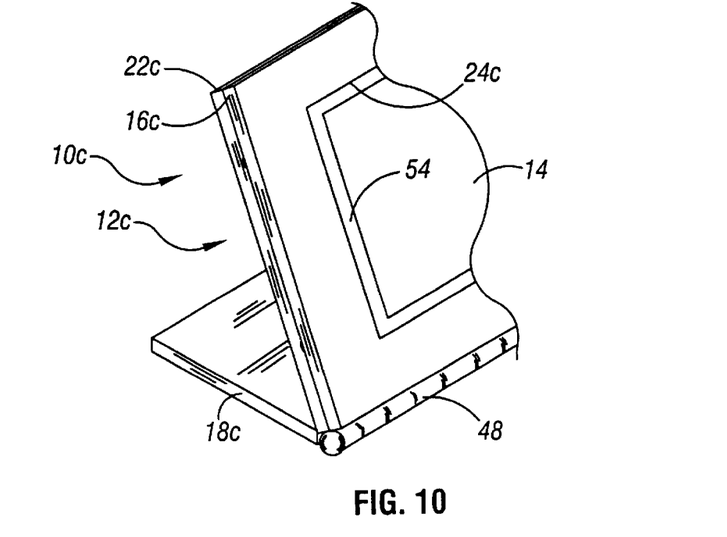
FIG. 10 is a partial perspective view of the embodiment shown in FIG. 9 but in the closed position with a portable digital display device in position in accordance with one embodiment of the present invention.

The embodiment shown in FIGS. 9 and 10 may be advantageous since the display device 14 may simply be placed in position within the recessed portion 44. No sliding motion may be needed which may be difficult for some users and may result in wear on the display device 14.

Finally, considering FIG. 11, the display device 14 may include a processor 60. In one embodiment, the processor 60 may be the StrongARM™ processor available from Intel Corporation, Santa Clara, Calif. The processor 60 may be coupled to the display 22. A wireless interface 62 enables the device 14 to have its display 22 controlled wirelessly from a processor-based base station (not shown). In addition, the device 14 may have input/output controls for providing control signals to the processor 60. These control signals may control the display, for example, in a personal digital assistant mode.

Also, the device 14 may have a battery power supply 66. The battery power supply 66 may be coupled to a docking interface 32 that interacts with the docking interface 28 of the display station 12. The display station 12 includes a power cord 20 coupled to a power supply 68.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A docking frame for a portable processor-based display device, said frame comprising:
   a receptacle to removably receive said device;
   a frame element coupled to the receptacle to frame the device; and
   a power supply to provide power to the device when the device is received in the receptacle.

2. The frame of claim 1 wherein said receptacle removably receives a battery powered processor-based display device.

3. The frame of claim 2 wherein said receptacle includes inductive contacts to communicate power to said device.

4. The frame of claim 1 wherein said power supply includes a power cord to connect to a wall power supply.

5. The frame of claim 1 wherein said frame element slidingly receives said device.

6. The frame of claim 1 including a stand coupled to said frame element to orient said frame element at an angle for viewing.

7. The frame of claim 6 wherein said receptacle includes a U-shaped slot shaped to receive said device, said receptacle positioned on the back of said frame element.

8. The frame of claim 1 wherein said receptacle is defined within the interior of said frame element, said receptacle adapted to slidingly receive said device.

9. The frame of claim 1 wherein said frame element includes an opening to display the display of said processor-based display device.

10. The frame of claim 1 wherein said frame element is adapted to pluggingly receive said device in a direction transverse to the plane of said frame element.

11. The frame of claim 10 wherein said frame element includes a front surface for displaying said display device and a back surface, said receptacle being accessible from the front surface of said frame element.

12. The frame of claim 11 including an opening in said receptacle to enable said device to be removed from said receptacle.

13. The frame of claim 1 including a hinged connection between said receptacle and said frame element, such that said frame element may be rotated atop of said receptacle when said device is positioned within said receptacle.

14. The frame of claim 13 including a stand connected to said receptacle.

15. The frame of claim 13 including a receptacle having a planar surface and a recessed portion to receive said device, said planar portion being covered by a matte material, said matte material being sandwiched between said frame element and said receptacle.

16. A system comprising:
   a portable processor-based display device;
   a receptacle to removably receive said device;
   a frame element coupled to the receptacle to frame the device; and
   a power supply to provide power to the device when the device is received in the receptacle.

17. The system of claim 16 wherein said receptacle is shaped to slidingly receive said display device.

18. The system of claim 16 wherein said display device is a battery powered display device.

19. The system of claim 16 wherein said device and said receptacle include mating electric contacts for electrical communication between said device and said receptacle.

20. The system of claim 19 wherein said contacts are inductive contacts.

21. The system of claim 16 wherein said power supply includes a power cord to connect to a wall power supply.

22. The system of claim 16 wherein said frame element is adapted to pluggingly receive said device in a direction transverse to the plane of said frame element.

23. The system of claim 22 wherein said frame element includes a front surface for displaying said display device and a back surface, said receptacle being accessible from the front surface of said frame element.

24. The system of claim 16 including a hinged connection between said receptacle and said frame element, such that said frame element may be rotated atop of said receptacle when said device is positioned within said receptacle.

25. The system of claim 24 including a receptacle having a planar surface and a recessed portion to receive said device, said planar portion being covered by a matte material, said matte material being sandwiched between said frame element and said receptacle.

26. A method comprising:
   providing a receptacle to slidingly receive a battery powered processor-based display device; and
   providing a frame element coupled to the receptacle to frame the display of the processor-based display device.

27. The method of claim 26 including enabling the receptacle to communicate wirelessly with a remote processor-based system.

28. The method of claim 26 including enabling the battery of said device to be charged when said device is positioned in said receptacle.

29. The method of claim 26 including enabling the processor-based display device to wirelessly communicate with a remote processor-based device while being charged via a receptacle connected to a frame element that frames the display of said device.

30. The method of claim 29 including enabling the processor-based display device to display pictures using battery power when said device is not received in said receptacle and when said device is received in said receptacle to display pictures using power supplied by said receptacle.

* * * * *